United States Patent Office 3,511,265
Patented May 12, 1970

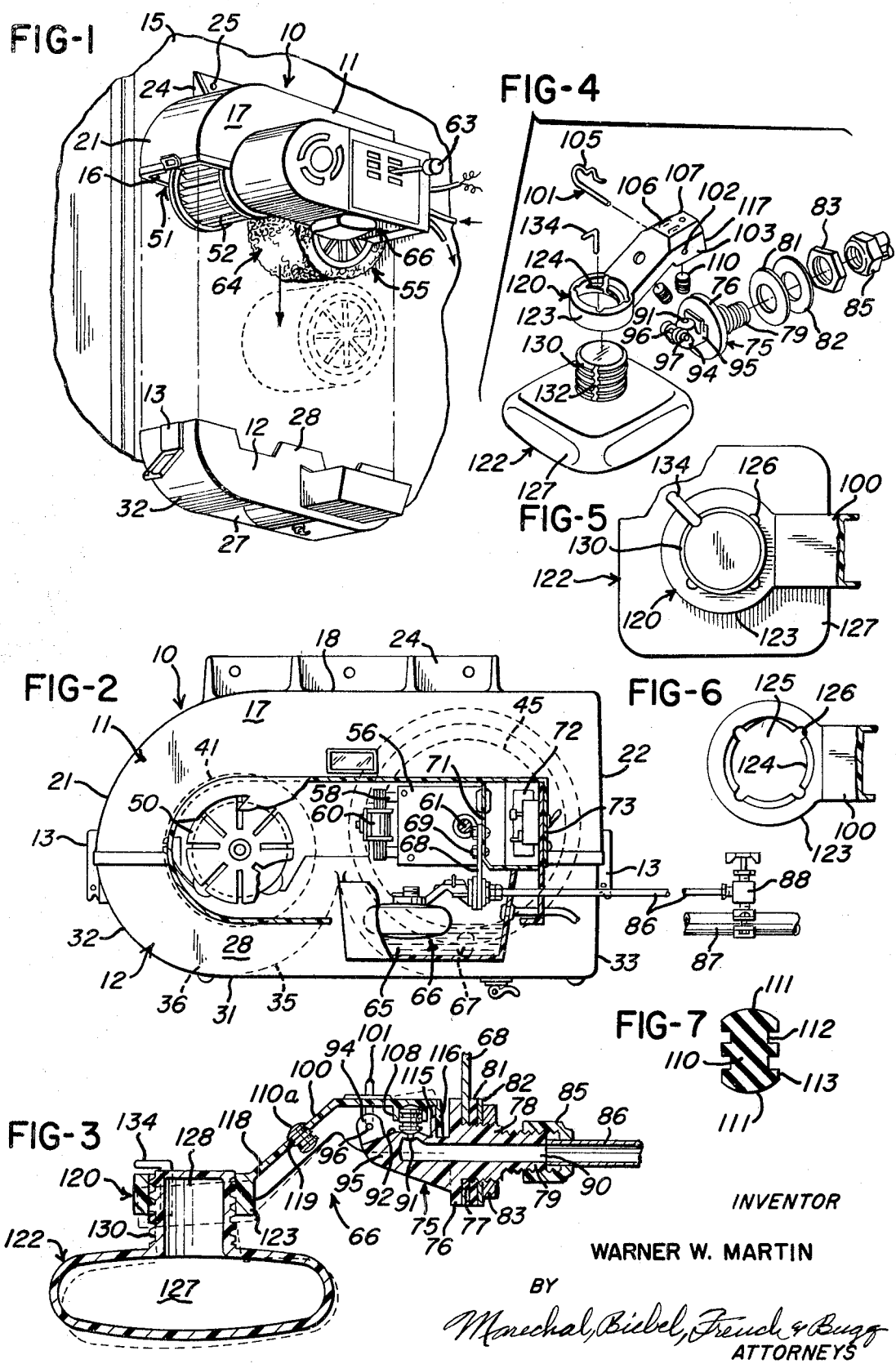

3,511,265
FLOAT VALVE ASSEMBLY
Warner W. Martin, Olmstead Falls, Ohio, assignor, by mesne assignments, to Lau Incorporated
Filed July 25, 1967, Ser. No. 655,947
Int. Cl. F16k *31/16, 33/00;* F24f *3/14*
U.S. Cl. 137—434                                8 Claims

ABSTRACT OF THE DISCLOSURE

A power operated humidifier adapted to be mounted on a furnace and having an improved float assembly for maintaining a constant level of water in the reservoir of the humidifier. The float is adjustable to compensate for different water pressures, it reduces splash, has a reversible valve member, and can be easily and quickly disassembled for cleaning.

BACKGROUND OF THE INVENTION

In humidifiers and other devices having liquid control systems therein, it is highly desirable to maintain the level of liquid as close as possible to a preset level. The liquid level is usually controlled by a float valve assembly having a float which is buoyant and operates a valve mechanism to open or close the valve in response to changes in the level of the liquid. However, since these assemblies are operated by forcing a valve member onto an orifice and since the liquid pressure flowing through the orifice frequently varies, the force generated by the float must vary proportionately to block the orifice. Thus, when the liquid pressure is higher, the float must exert a proportionately higher force by the float riding lower in the water and creating a water level greater than desired which can cause overflowing. The converse is also true with the result that a water level below that which is required for maximum efficiency of the humidifier or other device.

In addition, the prior art float assemblies are frequently constructed of metal parts which will corrode after a short period of use or, if non-corrosive metals are used, are expensive to construct. Some cork or Styrofoam floats frequently absorb water and accumulate minerals causing their buoyancy to be altered during operation, and many of these devices have a valve member which becomes deformed after use causing leakage and variation in the water level. Similarly, many of the prior art devices create a splash or spray when the valve is open with the possible result that water is sprayed onto electrical components, causes leakage from the device, or requires a water tight cover for the float chamber.

SUMMARY OF THE INVENTION

An improved float assembly for use in maintaining a precise level of liquid in a reservoir including a float which is secured to a valve actuator to permit adjustment therebetween depending upon the liquid pressure so that the liquid level in the reservoir remains constant regardless of liquid pressure. The assembly is splash and spray proof, constructed entirely of plastic, can be easily disassembled for cleaning, and the valve member is reversible to prolong the useful life thereof.

BRIEF DESCRIPTION OF THE DRAWINGS

FIG. 1 is an exploded perspective view of a humidifier in which the float assembly can be utilized;

FIG. 2 is a front view of the humidifier partially broken away to illustrate the interior thereof;

FIG. 3 is a sectional view taken centrally through the float assembly;

FIG. 4 is an exploded view of the float assembly;

FIG. 5 is a plan view of the locking mechanism on the float;

FIG. 6 is a plan view of one end of the actuator arm of the float assembly; and

FIG. 7 is a sectional view through the reversible valve member.

DETAILED DESCRIPTION OF THE DRAWINGS

FIG. 1 illustrates the self-contained humidifier 10 in which the novel float assembly can be utilized. The humidifier is hereafter shown and described for the purpose of setting forth one environment in which the float assembly can be used, and the humidifier is not intended to be a limitation on the invention. Moreover, this particular humidifier is shown and described in U.S. Pat. No. 3,274,992, issued Sept. 27, 1966 to the assignee of this invention.

The humidifier includes the upper and lower housings 11 and 12 clamped together by the clasps 13, and secured to the outside vertical wall 15 of a hot air furnace plenum or duct. The humidifier may be used with practically any conventional hot air heating device or air duct and only a fragmentary portion of the wall 15 thereof is shown in the drawings. The upper housing 11 is generally rectangular and has the back and front walls 16 and 17 with the top wall 18 formed integrally therebetween. The left-hand end of the top wall 18 curves gently downwardly to form the end wall 21 whereas the right-hand end wall 22 is substantially perpendicular to the adjacent walls 16–18. A reinforced mounting flange 24 is formed integrally on the top wall 18, and the screws 25 can be inserted to suitable openings therein to secure the entire humidifier 10 to the furnace or duct wall 15, as seen in FIG. 1.

The lower housing 12 is also generally rectangular with bak and front walls 27 and 28 (FIGS. 1–2) having the bottom wall 31 formed integrally therebetween. This bottom wall is connected integrally with the curved vertical end wall 32 on the left-hand end of the lower housing and the perpendicular end wall 33 on the opposite or right end thereof. The bottom wall 31 extends upwardly at an intermediate point to form a partition 35 which defines one side of the reservoir chamber 36.

The upper and lower housings 11 and 12 are coextensive in length and width so that they fit snugly together, to define an air flow chamber which has an inlet opening 41 in the back walls 16 and 27 of the upper and lower housings 11 and 12. An outlet 45 is formed in a similar manner by a cutout in the back wall 16 of the upper housing 11, and no mating cutout is made in the lower housing 11, since the back wall 27 forms one side wall of the reservoir.

The front wall 17 and the motor 50 with the drive shaft thereof extends through an opening in the wall 17 and into the air flow chamber 51. A single blower wheel 52 is mounted on this shaft and the inlet to this blower wheel is aligned axially with and spaced close to the inlet 41 of the air flow chamber 51 for drawing air into this chamber.

The evaporator drum assembly 55 is also mounted on the front wall 17 of the upper housing 11 in spaced parallel relationship with the blower wheel 52. This assembly includes the speed reduction unit 56 which is secured to the mounting bracket 58 (FIG. 2) on the front wall 17 and has the media drive motor 60 mounted thereon, and drives the drive shaft 61 at a relatively slow speed, e.g., four to six r.p.m. This drive shaft is tubular and extends into the air flow chamber 51 where it is releasably connected to the media wheel 64 by the fastened rod 63, as described in the aforesaid Pat. No. 3,274,992. The media wheel 64 consists of a frame having a sleeve of open cell evaporator material supported thereon, so that rotation of the wheel 64 effects similar rotation of the evaporator material.

A float chamber 65 is formed integrally with the lower housing 12 and extends outwardly from the front wall 28 thereof, as shown in FIGS. 1 and 2, to receive the float assembly 66 which is rigidly mounted on the upper housing 11. An opening 67 is provided in the front wall 28 so that water within the float chamber 65 passes readily into the reservoir 36 to maintain a preset water level therein which wets the media wheel 64. The float assembly 66 is supported in place by the bracket 68 which is secured by the bolts 69 to the interior wall 71 of the closed compartment 72 formed integrally within the cover 73 to house the electrical switches and connections.

The float assembly 66 is shown in detail in FIGS. 3–7 and includes the body 75 having the radial flange 76 extending centrally therearound. A semi-circular boss 77 or its equivalent on the inside of the flange 76 is received in a complementary groove in the bracket 68 to insure that the body 75 will be precisely positioned and held against rotation. On the right hand side of the flange 76, the body 75 includes a first externally threaded section 78 (FIG. 3) and an adjacent smaller externally threaded section 79. The body 75 is secured to the bracket 68 by inserting the sections 78 and 79 through an opening in the bracket and then placing the resilient washer 81, the metal washer 82 and the lock nut 83 on the first section to secure the body 75 in position. The plastic coupling 85 is utilized to secure the copper tubing 86 to the smaller section 79 of the body 75 by screwing the coupling on in the conventional manner. The tubing 86 leads to a source of water under pressure, for example, a water line 87 (FIG. 2) having a saddle valve 88 mounted thereon.

A passageway 90 extends centrally through the body 75 and has the upward vertical discharge orifice 91 formed on the left hand thereof through the generally frusto-conical surface 92. The diameter of the orifice 91 is carefully coordinated with the buoyant capacity of the float assembly 66 and the amount of water flow required by the unit 10. This surface prevents water accumulation and thus lime build-up which would ultimately result. A pair of fingers 94 extend upwardly from the left hand section 95 of the body 75, as shown in FIGS. 3 and 4, and having the openings 96 therein which support the actuator arm 100. An annular rib 97 is formed on the outer surfaces of the fingers 94 around the openings 96 to reduce friction when the arm 100 pivots, and to offer high torque to break any lime deposits up which might form thereon.

The actuator arm 100 is thus pivotally secured to the body by the removable clip 101 which extends through the openings 102 in the downwardly extending side walls 103 on the right hand end of the actuator arm and through the openings 96 in the finger 94. The clip 101 is generally U-shaped and the top portion 105 thereof is deformed to snap over the complementary projections 106 on the top surface 107 of the arm so that the clip 101 is releasably held in position to facilitate disassembly and cleaning of the float assembly 66. The diameter of the clip 101 is smaller than the openings 96 and 102 to reduce friction and provide relatively free pivotal movement of the arm 100.

The annular boss 108 is formed on the bottom of the horizontal surface 107 in alignment with the orifice 91 to receive the generally cylindrical valve member 110, as shown in FIG. 3. The resilient valve member 110 has the rounded ends 111 and a pair of circumferential grooves 112 formed in the cylindrical side walls 113 to facilitate easy alignment in the boss 108 as well as removal even in the presence of lime accumulation. The rounded ends 111 are adapted to engage the orifice 91 and block the flow of liquid therethrough when the arm 100 is urged in a clockwise direction, as shown in FIG. 3. The valve member 110 can be removed manually and reversed when one of the end surfaces 111 becomes permanently deformed after a period of use.

The body 75 has an upstanding partition 115 thereon which cooperates closely with the end wall 116 of the arm 100 to prevent the spraying of water past the right hand end of the arm. The side walls 103 extend downwardly a substantial distance below the orifice 91, so that spraying is confined thereby and the water merely drips from these side walls into the float chamber 65. The rear edges 117 of the side walls 103 contact the radial flange 76 and limit downward or counterclockwise movement of the arm 100 to prohibit spraying and possible lock-up in the reservoir 65 if the arm 100 were allowed to extend downwardly. Similarly, the downwardly sloping intermediate section 118 of the actuator arm 100 prevents spraying in the forward direction so that there is no possibility of liquid spraying beyond the valve assembly. A replacement valve member 110a is normally provided in the opening 119 in the intermediate section 118 so that it can be easily removed and installed once both end surfaces 111 of the original valve member 110 are worn out.

The right hand or lower section 120 of the arm 100 is adapted to support the float 122 and includes the integral annular ring 123 having the internal threads 124 therein which define the opening 125. A plurality of vertical grooves 126 are formed through these threads for use in locking the float 122 in position, as will be described. The float 122 itself is hollow and preferably blow molded from plastic material and includes the sealed, air tight, hollow body section 127 having the hollow neck 128 extending centrally upwardly from the top surface of the body section 127. The neck 128 has complementary external threads 130 thereon adapted to be received within the opening 125. A single vertical groove 132 is cut through the external threads 130 and is adapted to be aligned with any of the grooves 126 in the internal threads, as shown in FIGS. 5 and 6. When so aligned, the L-shaped lock pin 134 of round cross section can be inserted into the aligned grooves to prohibit relative rotation between the actuator arm 100 and the float 122 to lock these two components together.

When the humidifier or other device 10 is being installed, the person doing the installation first determines the water or other liquid pressure in the system to be utilized. Once this information is obtained, the neck 128 of the float is screwed into the actuator arm 100 a predetermined number of revolutions provided in the instructions and correlated with the known water pressure. Usually, a ¼ turn of the neck 128 provides an adjustment for 10 pounds of water pressure. By making this adjustment, the buoyancy of the float 122 will be adjusted to provide the precise amount of force to the valve member 110 to cause it to block the orifice 91 only when the water in the flow chamber reaches the precise predetermined level. In this manner, the level of water in the float chamber 65 and the reservoir is always maintained at a constant level regardless of where the humidified or other device is installed thereby providing for maximum efficiency.

In operation, once the float assembly 66 is properly adjusted, the weight of the float 122 causes it to pivot the arm 100 to separate the valve member 110 from the orifice 91. This in turn allows the water to flow through the tube 86, the passage 90, the orifice 91 and into the float chamber 65. As the water flows through the orifice 91, any spray is restricted by the walls 103, 115, 116 and 118 so that the water drips therefrom into the chamber 65. When the water level reaches the precise predetermined level, the buoyancy of the float 122 will exert, through the arm 100, a sufficient force on the valve member 110 to completely block the flow through the orifice 91. When the level in the float chamber 65 drops, the float 122 drops causing the valve member 110 to be moved away from the orifice 91 until such time as the level is restored.

To clean the float assembly 66 it is merely necessary to remove the clip 101 to separate the arm 100 from the body 75. The orifice 91 can be cleaned and the valve member 110 reversed or exchanged as necessary. Similarly the arm 100 and float 122 can be cleaned of any scum or accumulated salts. It is a simple task to align the openings 96 and 102 in the fingers 94 and walls 103 to reinsert the clip 101.

The invention has accordingly provided an improved float assembly which can be utilized in a humidifier or any other device in which a precise liquid level must be maintained. The float is adjustable to compensate for variations in water pressure and thus the precise level is attained regardless of where the device is installed. The float assembly can be easily disassembled for cleaning, prohibits any spraying or splashing, and the valve member is reversible.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. In a humidifier including an air flow chamber, a blower wheel mounted in said air flow chamber, an evaporator drum assembly positioned in spaced parallel relationship to said blower wheel, a reservoir chamber, a float chamber, an electrical housing mounted adjacent said float chamber, means defining an opening interconnecting said reservoir chamber and said float chamber, a source of water under pressure, tubing interconnecting said source of water and said float chamber, and a float assembly for maintaining a predetermined water level in said float chamber, said float assembly comprising:
   (a) a body member having a passageway extending centrally thereof,
   (b) said passageway communicating with said tubing at one end thereof and with an orifice at the other end thereof,
   (c) said orifice extending vertically upwardly from said passageway,
   (d) a section of said body portion extending past said orifice,
   (e) a pair of fingers extending upwardly from said section, said fingers having registering openings formed therein,
   (f) a float positioned in said float chamber,
   (g) an actuator arm attached to said float on one end and pivotally attached to said fingers at the opposite end thereof by means of a clip passing through an opening in said arm and said openings in said fingers,
   (h) a substantially horizontal portion of said arm extending past said fingers in overlying relationship to said orifice,
   (i) an annular boss formed in said horizontal portion,
   (j) a resilient valve member mounted in said boss,
   (k) a partition extending upwardly from said body member on the side of said orifice opposite said section,
   (l) an end wall extending downwardly from said horizontal portion in closely spaced relationship to said partition,
   (m) side walls extending downwardly from said horizontal portion on opposite sides of said orifice, and
   (n) a downwardly sloping intermediate section of said arm extending from said horizontal portion toward said float.

2. The apparatus of claim 1 wherein:
   (a) portions of said body member adjacent said orifice are of frusto-conical configuration sloping downwardly, away from said orifice; whereby mineral deposits on said body member adjacent said orifice are substantially decreased.

3. The apparatus of claim 2 wherein:
   (a) an annular rib is formed on the outer surface of each of said fingers around each of said openings.

4. The apparatus of claim 3 wherein:
   (a) said resilient valve member has rounded ends, cylindrical side walls and circumferential grooves formed in said side walls, and
   (b) said valve member is mounted in said boss with one rounded end seated in said boss and the other rounded end overlying said orifice.

5. The apparatus of claim 4 wherein:
   (a) an opening is formed in said intermediate section of said arm, and
   (b) a second resilient valve is mounted in said opening.

6. The apparatus of claim 5 wherein:
   (a) said clip is of generally U-shaped configuration,
   (b) one leg of said clip passing through said openings in said arm and said fingers,
   (c) the other leg of said clip overlying said horizontal portion of said arm and having deformations formed therein,
   (d) said horizontal portion having projections thereon complementary to said deformations.

7. The apparatus of claim 5 wherein:
   (a) substantially all components of said float assembly are formed of a plastic material.

8. The apparatus of claim 7 wherein:
   (a) said float is of one piece, blow molded construction.

References Cited

UNITED STATES PATENTS

| | | | |
|---|---|---|---|
| 484,384 | 10/1892 | Whittingham | 137—329.03 |
| 1,288,688 | 12/1918 | Salucka | 137—426 X |
| 1,462,599 | 7/1923 | Hawes | 137—443 X |
| 1,980,430 | 11/1934 | Pearse | 137—434 X |
| 2,059,359 | 11/1936 | Karges | 137—448 |
| 2,117,056 | 5/1938 | Dunn | 137—329.04 X |
| 2,855,970 | 10/1958 | Neuschotz | 151—8 X |
| 3,004,748 | 10/1961 | Sprouse et al. | 137—426 X |
| 3,064,773 | 11/1962 | Linecker. | |
| 3,310,065 | 3/1967 | Godshalk | 137—426 X |

WILLIAM F. O'DEA, Primary Examiner

D. R. MATTHEWS, Assistant Examiner

U.S. Cl. X.R.

251—234; 126—113; 151—8